Feb. 22, 1966 B. J. WARMAN ETAL 3,236,953

REGISTER-TRANSLATOR APPARATUS

Filed April 8, 1960 6 Sheets-Sheet 1

Feb. 22, 1966 B. J. WARMAN ET AL 3,236,953

REGISTER-TRANSLATOR APPARATUS

Filed April 8, 1960 6 Sheets-Sheet 2

Feb. 22, 1966 B. J. WARMAN ETAL 3,236,953

REGISTER-TRANSLATOR APPARATUS

Filed April 8, 1960 6 Sheets-Sheet 3

United States Patent Office 3,236,953
Patented Feb. 22, 1966

3,236,953
REGISTER-TRANSLATOR APPARATUS

Bloomfield James Warman, Charlton, London, Ronald Robert Ewington, Seven Kings, Ilford, and James George Taylor, Eltham, London, England, assignors to Associated Electrical Industries Limited, London, England, a British company Filed Apr. 8, 1960, Ser. No. 20,878
Claims priority, application Great Britain, Apr. 10, 1959, 12,250/59
12 Claims. (Cl. 179—18)

Figure 1A:
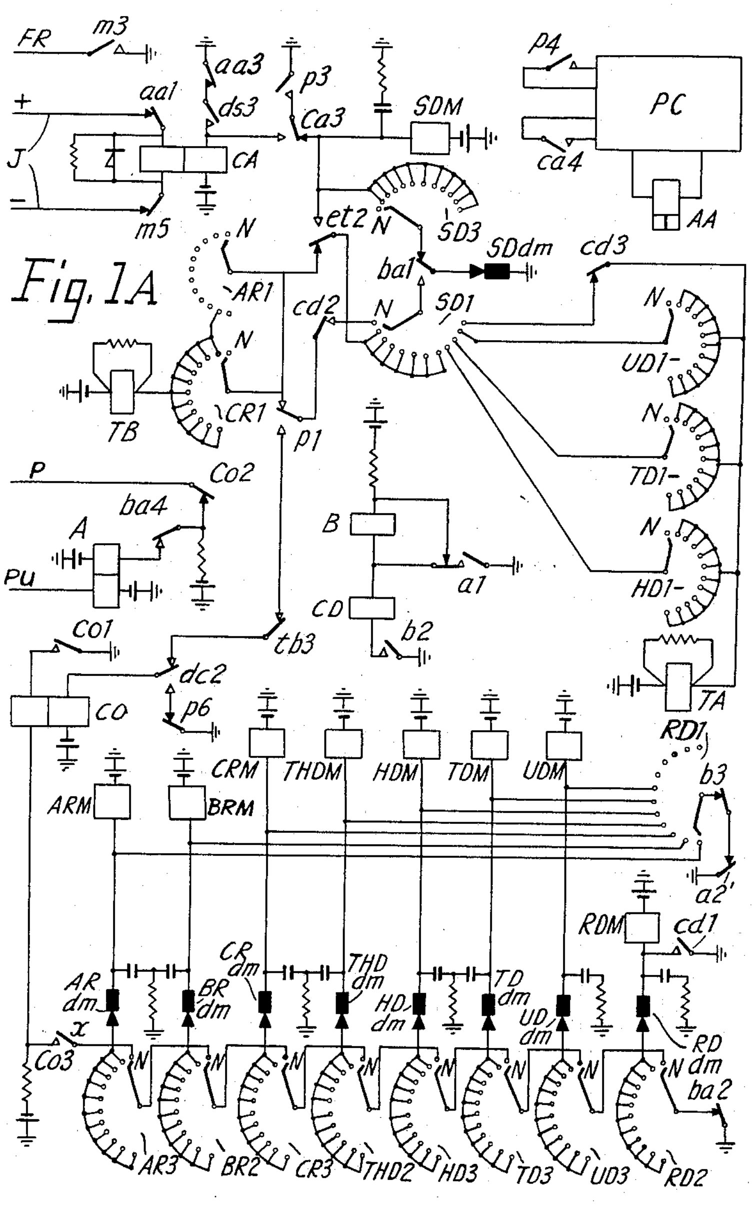

This invention relates to register-translator apparatus, including so-called directors, as used in automatic telephone and other telecommunication systems, being more especially concerned with the register part of such apparatus than with the translator part.

In register-translator apparatus the register, or register sender as it is sometimes more fully called, has the function of receiving and storing code and numerical digits received in the form of impulse trains to identify a called line, of passing at least some of the code digits to a translator which returns translation digits to the register, and of sending these translation digits over an outgoing line as trains of impulses, usually followed by the stored numerical digits also sent as trains of impulses. A single translator may serve a number of registers, one at a time, and some means is then provided for allocating the translator to a particular register which requires its service. For instance a register awaiting the use of a translator may apply a marking (that is a distinctive potential) to a signal lead extending from the register and a circuit associated with the translator may respond to such signal, when the translator is free, to allocate the translator to that register or to a selected one of the waiting registers if several are awaiting attention at the same time: alternatively a scanning circuit associated with the translator may effectively scan the signal leads from the registers and on reaching a marked lead may respond to the marking by stopping the scanning action and allocate the translator to the register to which that particular marked lead relates, the scanning being recommended once the register has finished with the translator.

It is clearly desirable that where a number of registers are served by a common translator, the time for which the translator is dealing with any register should be kept as short as possible in order that other registers may be attended to with a minimum of delay. The time actually taken by the translator to provide a translation after receipt of the code digits from a register can be kept short by employing electronic or static electromagnetic devices in the translator in preference to electromechanical devices such as relays. Moreover, since the register sends out the translation digits as pulse trains having a significant pause between them, it can be arranged, although in some circumstances it may be desirable not to do so, that a register takes the digits of a required translation only one at a time from the translator, and releases the translator between digits in order to permit it to serve other registers.

In the register itself, the time required for passing code digits to the translator, and the time for which the register has to hold the translator in order properly to accept a translation digit, are also of importance. The portions of the register concerned with these actions should therefore also operate at high speed and it would be desirable to be able to use electronic or static electromagnetic devices for these parts also. Other parts of the register which have a high usage rate would also preferably be non-electromechanical (the life of electromechanical devices being directly related to the amount of use made of them) but elsewhere electromechanical devices could be used in order to take advantage of economy which can thereby be obtained.

According to the the invention, in a register circuit which particularly lends itself to economic use of electromechanical and electronic or static electromagnetic devices in combination, received code and numerical digits are stored in individual electromechanical storage devices and subsequently, at a time when the translator is available to serve the register, the values of the code digits to be translated are passed to the translator over sets of leads which, under control of the digit storage devices, are marked in a combination according to the code digit values. The translation digits are then received and recorded by static storage devices in the register, one at a time or otherwise, and in accordance with the values of the translation digits the register sends out over an outgoing line successive trains of impulses representing these digits. After all the translation digits have been dealt with in this way, the stored numerical digits are likewise sent out over the outgoing line as impulse trains, except if the received code was such that the register is required to send out only the translation digits. In this latter case the register may receive a signal from the translator indicating the fact, and in response to such signal may be terminated in its action after sending out the impulse trains corresponding to the translation digits but without sending impulse trains corresponding to the numerical digits.

In carrying out the invention the electromechanical code digit storage devices are preferably what are known as digit switches which become set according to the digit values in a received code. A signal received by the register from the translator, indicating that the latter is available to serve that register, may then cause a marking to be applied to the moving contacts (wipers) of these digit switches which, being by this time set according to the received code, extend this marking in accordance with their settings to sets of code marking heads connected to their bank contacts and extending into the translator, these leads being commoned to the bank contacts of corresponding digit switches in the other registers served by the same translator. In each register the marking of the moving contact of each of the digit switches may be effected through a code transferring switch operated by the signal from the translator. This switch, which may be common to the digit switches, may be electromechanical, for instance a contact of a high speed relay, or electronic, for instance a transistor: the operation of the switch by the signal would then be the closure of the relay contact or the rendering of the transistor conductive, as the case may be. The numerical digit storage devices would also preferably be constituted by electromechanical digit switches.

If the code digit storage devices had been electronic in character rather than electromechanical, the code marking leads extending from them to the translator would have to be individually isolated, namely from the corresponding storage devices of the other registers to which they are commoned, by rectifiers or other isolating devices connected between these storage devices and the common point from which the leads go to the other registers. It has now been realised however, that since electromechanical digit switches have an adequate speed of response to properly receive and store an incoming code, and since they will already be set prior to a translation being requested by the register, they can be used instead of electronic devices with little or no consequent loss in the overall speed of response of the register. Moreover by using electromechanical digit switches for code storage, it becomes possible for the isolation, which is required because the code marking leads are common to the digit switches in the several registers, to be effected on the moving contact (wiper) side of the digit switches, with the result that only one isolating device is required per code digit switch instead of one for each of the code marking leads extending from it to the common points of such leads.

In addition to bringing about the marking of the code marking leads according to the stored code digits, the code transferring switch already referred to may, while operated, permit the maintenance of a holding condition by which the translator is held by the register. A translation receiving circuit in the register may then include an auxiliary switch (again electronic or electromechanical) which is operated in response to receipt of the required translation information from the translator and which on operating causes restoration of the code transferring switch so that the holding condition is removed and the translator is therefore released. In this way it can be ensured that once the translator has been allocated to serve a particular register, it cannot be released to serve another register until the first register has removed the markings which it applied to the code marking leads: consequently in the event of a fault preventing such removal, the translator is effectively locked to the first register and cannot be allocated to deal with another one which, by reason of the non-removal of the code markings from the first register to the translator, might otherwise receive a false translation.

Figure 1B:
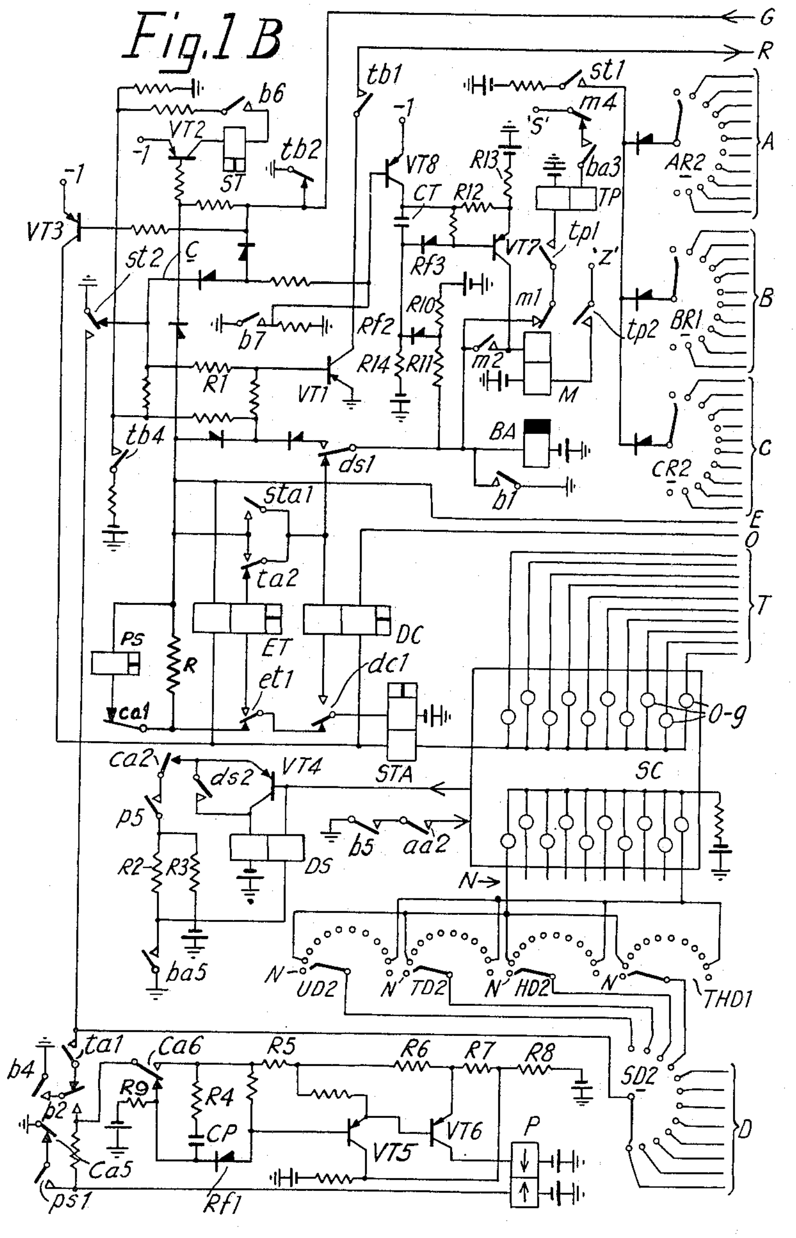
Figure 2:
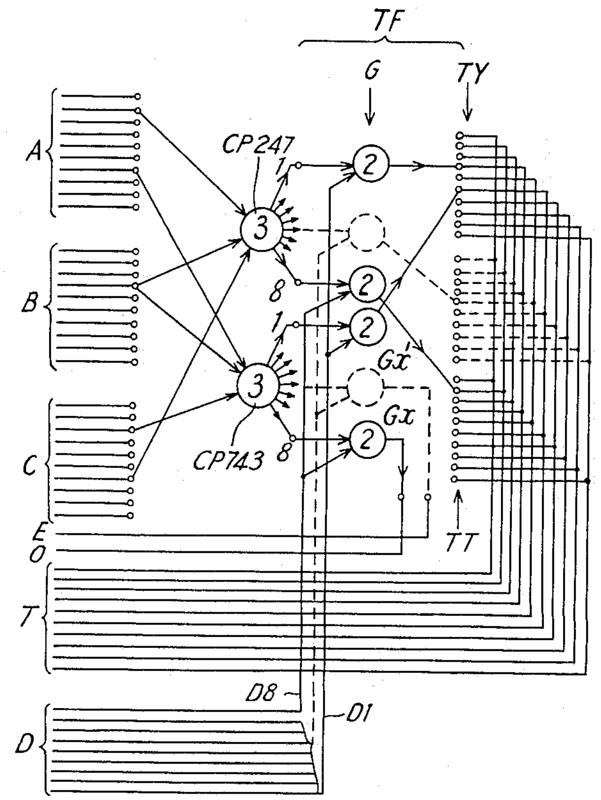
Figure 3:
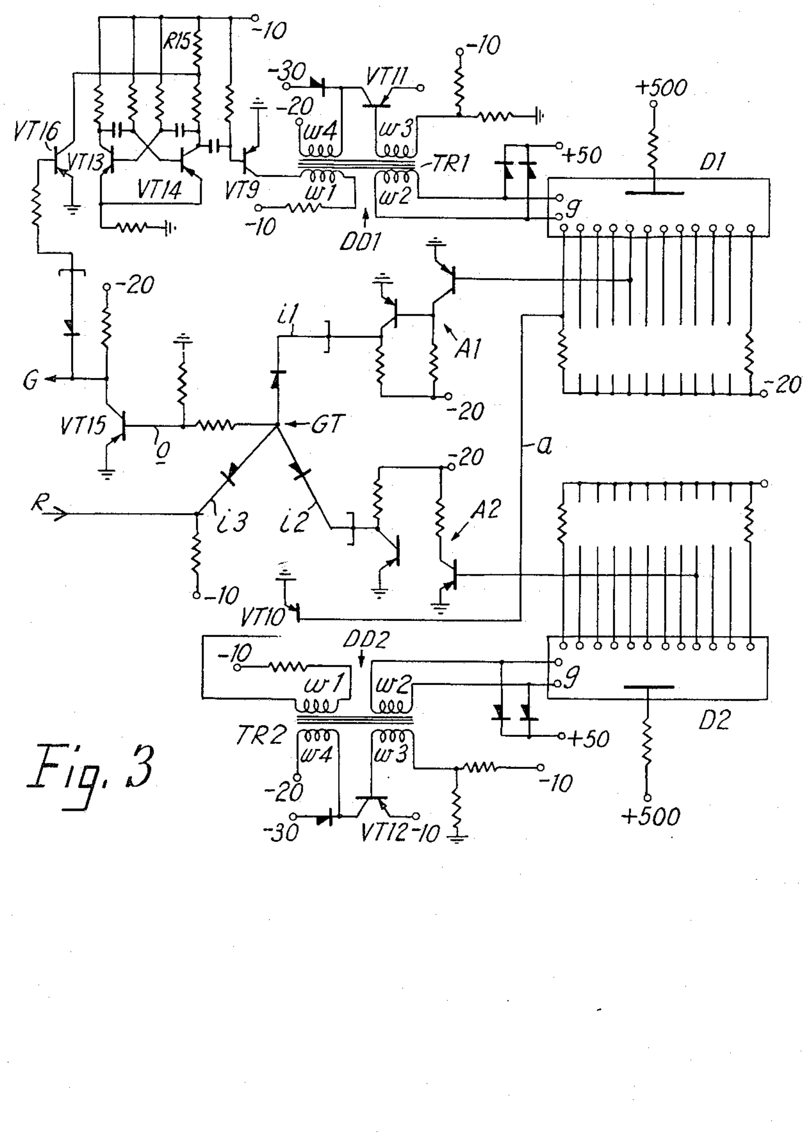
Figure 4:
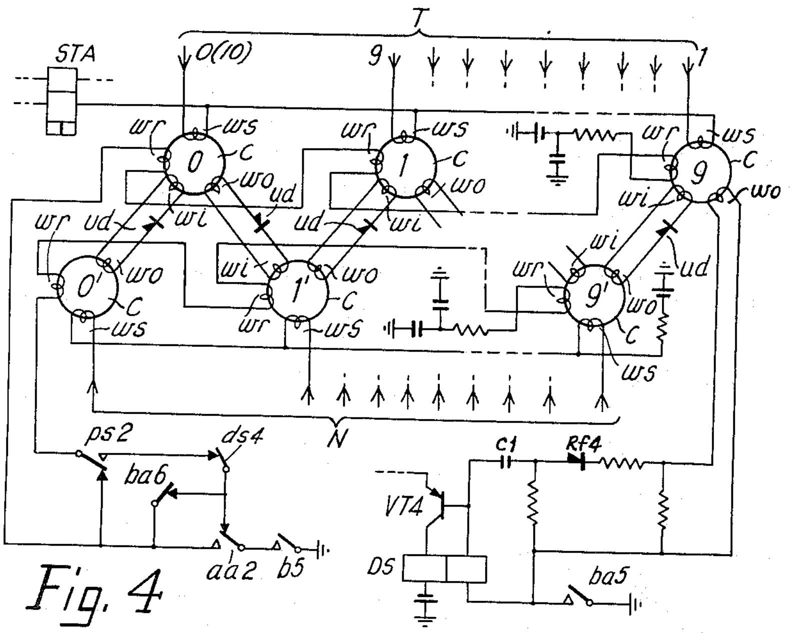
Figure 5:
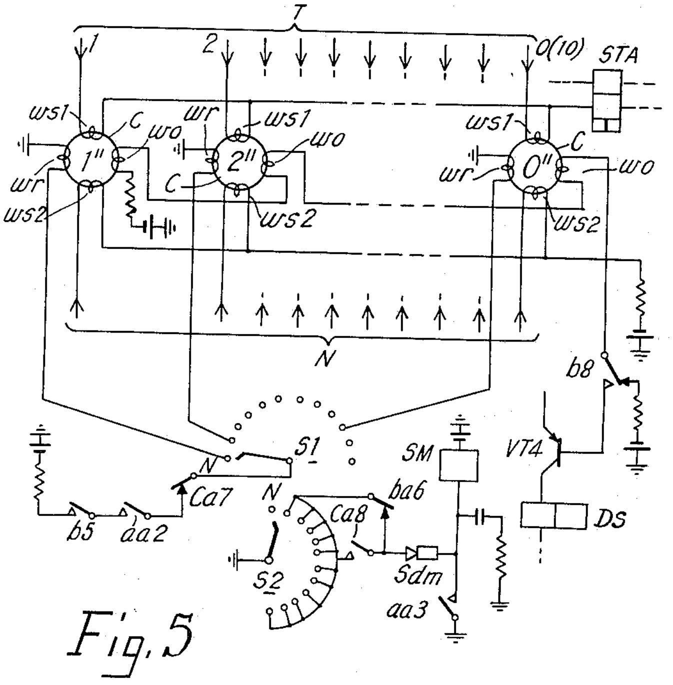
Figure 6:
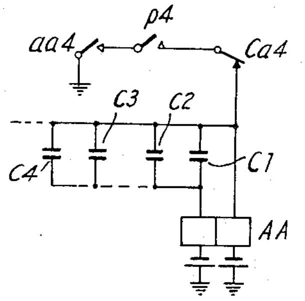
Figure 7:
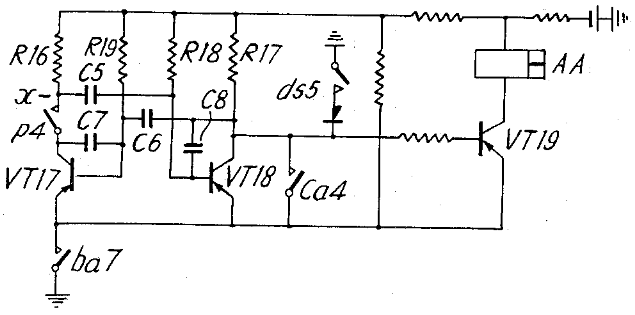

The invention may be more fully understood from the following description of a particular embodiment which is given by way of example and incorporates various subsidiary features. As will appear, some of the components employed for this embodiment are electromechanical, while others, having a high usage rate or being required to afford high speed operation, are of an electronic or static electromagnetic nature. In describing this embodiment reference will be made to the accompanying drawings in which:

FIGS. 1A and 1B together constitute a circuit diagram of a register embodying the invention, FIG. 2 is a logical diagram of a particular form of translator with which the register is assumed to be associated, FIG. 3 is a circuit diagram of a scanning circuit by which the translator, which serves a plurality of registers in common, can be allocated to deal with one of them which requires its services, FIG. 4 is a circuit diagram of one form of outgoing impulse counter which may be used in the register of FIG. 1, FIG. 5 is a circuit diagram of another form of impulse counter which may be used in the register of FIG. 1 instead of that of FIG. 4, and FIGS. 6 and 7 are circuit diagrams of two forms of circuit for producing impulsing operation of an impulse generating relay in the register of FIG. 1.

It will be assumed that the register circuit constituting this embodiment will usually receive over an incoming wire PU, seven successive trains of impulses representing, by the numbers of impulses therein, the values of three code digits followed by four numerical digits, there being a significant pause, as is usual, between the successive impulse trains. These impulse trains are responded to in known manner by an impulse receiving relay A which, being initially operated on one winding (the pick-up winding) by completion of an energizing circuit for it over wire P, is subsequently periodically released and re-operated on another winding (the impulsing winding) in rhythm with incoming impulses received over wire PU as break impulses: that is, each impulse is produced by interrupting the energizing circuit for a specific time defining the impulse duration. The initial operation of the impulse receiving relay A is equivalent to seizing the register, which is thereafter held seized, until it has fulfilled its functions, by means of a holding relay B which operates in consequence of the initial operation of the impulse receiving relay A and is arranged to be slow releasing so that it will remain operated during such times as the impulse receiving relay A is released by the break impulses, but will release subsequently to final release of relay A when the register itself is released. Slow release of the holding relay B with relatively rapid operation thereof is achieved by providing the impulse receiving relay with a make-before-break contact *a1* which in its operated position completes an energizing circuit for the holding relay B and in its released position breaks this circuit and applies a delaying short circuit across the winding of the holding relay B. Operation of the holding relay B brings about, via contact *b1*, the operation of a slow acting slave relay BA with which it collaborates in establishing, at contacts *b* . . . and *ba* . . . energizing connections for various parts of the circuit. Contact *ba4* on operation of relay BA, disconnects the pick-up winding of relay A to permit it to be impulsed on its other winding.

For digit storage, the register circuit includes seven uniselector digit switches AR, BR, CR, THD, HD, TD and UD, of which the first three are respectively allocated for storing the code digits and the other four are allocated for storing the numerical digits. The circuit also includes two other similar uniselector switches RD and SD of which RD acts as a receiving distributor which distributes the received digits to the relevant digit switches, while SD, which may be called the sending distributor, serves a function which will be described later.

Each of these nine uniselector switches is operable through one step at a time by de-energization of an individual operating magnet after prior energization thereof, switches of this kind being well known. The magnet of each uniselector switch is represented conventionally and is identified by the letter M prefixed by the reference letters of the switch; e.g. magnet ARM belongs to digit switch AR. Each uniselector switch also has interrupter contacts which are opened on energization of its magnet, these contacts being identified by the letters *dm* prefixed by the reference letters of the switch. Each switch has two or more appropriately numbered contact arcs each having an associated wiper: for instance switch SD has three arcs SD1, SD2 and SD3. In order not to confuse the drawings, no attempt has been made to keep the several arcs of a switch together. Rather the positions of the arcs on the drawing have been chosen with a view to minimising the number and length of the interconnecting lines and thereby making the drawing as easy to follow as possible. All the uniselector switches are shown in the "normal" or "home" positions of their wipers.

With the holding relay B operated, the first release of the impulse receiving relay A in response to a first break impulse, results via contacts *b2* and *a1* in the operation of a receiving distributor control relay CD which thereupon brings about via its contact *cd1* the energization of the operating magnet RDM of the receiving distributor RD. This control relay CD has a slow release time which ensures that it will not release while the impulse receiving relay A is operated between successive break impulses, but that it will release in the relatively long time for which the impulse receiving relay A is operated between successive impulse trains. With the receiving distributor RD in its "normal" or "home" position, the operating magnet ARM of the first digit switch AR is under the control of a break contact *a2* of the impulse receiving relay via arc RD1 and contact *b3* of the holding relay B. During the first impulse train therefore, the alternate release and operation of relay A causes this digit switch AR to be stepped to a position which corresponds to the value of the first (code) digit as represented by the number of impulses in the train. At the end of the first impulse train, the receiving distributor control relay CD releases and at its contact *cd1* de-energizes the magnet RDM of the receiving distributor RD, which thereupon steps to its next position and thereby puts the operating magnet BRM of the second digit switch BM under the control of the break contact *a2* of the impulse receiving relay A. The digit value represented by the next impulse train is therefore stored on the second digit switch BM and the procedure is thereafter repeated for the remaining impulse trains until all the digits have been stored on switches AR, BR, CR, THD, MD, TD and UD respectively.

When the first three digits have been stored on digit switches AR, BR, CR, these being the code digits, the register has enough information to request the services of the translator. This is achieved by operation of a request relay TB which over its contact *tb1* applies a marking to a "request" signal lead R, this marking being derived for instance through a first transistor VT1 which is brought into conduction consequent upon closure of contact *tb4* on operation of relay TB. The request relay TB is connected in common to the off-normal contacts of a contact bank CR1 of the third code digit switch CR and is operated, provided that the sending distributor SD is normal, when the digit switch CR has been moved off-normal for the third code digit and the receiving distributor control relay CD releases at the end of the impulse train representing this third code digit. The operating circuit for relay TB can be traced via arc CR1 of digit switch CR when off-normal, contact *p1* of an impulse controlling relay P which will be referred to later, contact *cd2* of relay CD, arc SD1 of the sending distributor switch SD when normal, contact *ba1* of relay BA (operated), and interrupting contacts SD*dm* of distributor switch SD.

Should a translation for a single received digit be at times required—for instance in calling a manual operator—the request relay TB may also be connected, as shown, so as to be likewise operated over contact arc AR1 of the first digit switch AR when the latter becomes set in response to an impulse train representing such single digit.

As has already been indicated, the invention is more concerned with the register than with the translator, and it is therefore considered to be unnecessary to describe any particular form of translator in detail. For the purposes of the present description it may be assumed that the translator is of a form in which markings received from a register over code marking leads which are marked by it in a particular combination unique to the code to be translated, are combined to apply to a code point individual to that code a marking which, in respect of each digit in the translation for the code, is extended from the code point, across a translation cross-connection field, towards the relevant one, according to the digit to which the connection relates and the value of that digit, of a number of translation terminals each relating to a particular value of a particular translation digit and having a connection from it to a translation lead relating to that digit value and extending back to the register.

It will also be assumed that the register is adapted to receive and deal with the translation digits one at a time, to which end it extends to the translator, over one of a number of digit selection leads, a marking which, according to the selection lead to which it is applied, identifies a required translation digit and causes the code point marking, as extended over the translation cross-connection field towards the terminals relating to the several values of the several translation digits, to be effective at only that one of those terminals which relates to the required digit. The value of the required translation digit is thus extended back to the register by the marking from that translation terminal of the relevant translation lead. This general form of translator is represented in FIG. 2 in a so-called logical manner. The three groups of leads A, B, C represent the code marking leads which the register marks, one in each group, according to the respective values of the code digits which it receives. The marking combinations on these leads are combined in code point gate circuits such as CP247 and CP743, and from each of these gate circuits a number of output connections, one for each digit of the translation from the relevant code, extend across a translation cross-connection field TF towards the relevant translation terminals TT in a number of groups each of which pertains to a particular translation digit and includes one translation terminal for each possible value of that digit. On the assumption that a translation may consist of up to eight digits there would be eight such groups of translation terminals and up to eight output connections from each code point gate circuit. Only two groups have been shown for the sake of clarity, the presence of the other groups being indicated in dotted lines. The group of leads D represents the digit selection leads, and for the purpose of permitting digit selection according to the marking of these leads the output connections from the code point gate circuits are shown as including coincidence gates G which are only "open" when primed by the presence of a marking on the relevant digit selection lead. The translation terminals in each group are connected to respective leads in a group T representing the translation leads. Thus, dependent on the combination of markings received on the A, B and C groups of leads to identify a code requiring translation and on the particular lead marked in the D group to indicate which digit of the translation is required, the combined marking obtained at the relevant code point gate will be extended over the cross-connection field TF to mark the relevant lead in group T according to the value of the required translation digit. It is emphasized that FIG. 2 illustrates the translator in logical form only: practical forms of translator performing the same logical function are described for instance in our copending application Serial Nos. 671,167 and 20,426.

Returning now to FIG. 1, the register includes groups of leads A, B, C, D and T which are connected to the corresponding groups of leads in the translator in common with corresponding groups of leads from other registers served by the translator. The "request" signal lead R, and a "proceed" signal lead G, extend from the register to an allocating circuit which, in response to a marking received over the "request" signal lead of any register, in due course allocates that register for service by the translator and applies to its "proceed" lead G a marking indicating that the register can proceed to obtain the translation it requires. The allocating circuit may be a "one-only" selector circuit or may be a scanning circuit which scans the registers for one in which the "request" lead is marked and on reaching such register stops its scanning action and sends the "proceed" marking to it. A suitable form of register scanner for this purpose will be described later with reference to FIG. 3.

In the register, provided that its request relay TB remains operated and contact *tb2* is therefore open, the marking signal received over the "proceed" lead G to indicate that the translator has been allocated to serve this register, brings about the operation of a high speed code transferring relay ST, doing so through a transistor VT2 which the marking renders conductive. The code transferring relay ST thereupon applies to the code marking leads A, B, C, over its contact *st1* and marking contact arcs AR2, BR1, CR2 of the set code digit switches AR, BR, CR, a combination of markings corresponding to the code for which translation is required. These markings take the form of potentials derived from a battery or other suitable supply behind contact *st1*. The operation of the code transferring relay also results in its contact *st2* applying an (earth) marking to the first of the digit selection leads D over contact arc SD2 of the sending distributor SD in its normal position. The translator then functions as already described and marks one of the translation leads T according to the value of the first translation digit.

In the register, the translation leads T are taken as setting input leads to an outgoing impulse counter SC including storage elements which, in response to the marking of these leads, become set in dependence on the value of the translation digit. At the same time a high speed auxiliary relay STA is operated in response to the received translation marking.

The impulse counter SC, represented in block form in FIG. 1, has the function of determining when the register has sent out the requisite number of impulses according to the value of a received translation digit as stored in its storage elements. It may take various forms and for the purposes of illustration has been assumed to include so-called ferrite core magnetic storage elements of well-known kind which by appropriate energization of associated windings can be "set" to one stable condition of magnetization of the core or "reset" to an opposite condition. Two possible forms for the counter SC, employing such ferrite core storage elements, will be described later with reference to FIGS. 4 and 5. In the block SC in FIG. 1 the circles numbered 0 . . . 9 represent windings by which one or another of respective ferrite core elements can be set in accordance with the particular translation lead T which may be marked and therefore in accordance with the value of the translation digit. Since the core elements are by nature current responsive, the auxiliary relay STA is connected in series with them: if voltage responsive elements were employed instead, a parallel connection of relay STA would be apropriate. The operation of the auxiliary relay STA, and also the setting of the storage elements associated with counter SC, are made dependent on prior receipt of a marking over the "proceed" signal lead G by the provision in series with relay STA of a transistor VT3 which can only conduct to permit energization of this relay when such marking on lead G is present at its base; this ensures that the register cannot respond to a received translation marking intended for another register.

On operating, relay STA releases the code transferring relay ST, doing so in the illustrated example, where relay ST is controlled through transistor VT2, by applying to the base of this transistor via contact *b1* of relay B (operated), contact *ds1* of an impulse stopping relay DS (unoperated) the function of which will be considered later, and contact *sta1* of relay STA, a potential (earth) which cuts off the conduction of this transistor. At contact *st2* the release of relay ST applies via resistor R1 to the base of transistor VT1 a potential (earth) which cuts off this transistor and thereby removes the marking from the "request" signal lead R. This effectively releases the translator to deal with other registers requiring its services, the scanner being allowed to restart to search for such other register. By thus effectively holding the translator until the code transferring relay ST is released, the possibility is removed of the transistor being allocated to deal with a second register which might then receive the translation for the code sent into the translator by the first register.

The auxiliary relay STA, on operating, establishes via its contact *sta1* an energizing circuit for a holding winding of its own and for an impulse initiating relay PS, this circuit being traced via contacts *b1*, *ds1*, *sta1*, winding of relay PS, contacts *ca1*, *et1*, and *dc1* (unoperated) of relays CA, ET and DC the functions of which will be described later, and the holding winding of relay STA. At contact *ps1*, operation of relay PS brings about the operation of an impulse controlling relay P, which at its contact *p2* establishes a holding circuit for itself, at its contact *p3* establishes an energizing circuit for the operating magnet SDM of the sending distributor SD, at its contact *p1* releases the request relay TB, this release being consolidated by the opening of the interrupter contact SD*dm* of the sending distributor SD, and at its contact *p4* initiates operation of a circuit PC by which an impulse generating relay AA, having an impulsing contact *aa1* in a loop across outgoing + and − wires J, is alternately operated and released. The circuit PC may take various forms, two examples of which will be described later with reference to FIGS. 6 and 7. Another contact *aa2* of the impulse generating relay AA feeds impulses into the impulse counter SC, which, when the number of impulses reaches that required according to the value of the stored translation digit, brings about the operation of an impulse stopping relay DS via a transistor VT4 which was previously back-biased by the voltage drop across a low resistor R2 in series with a relatively high resistor R3. The relay DS has two windings which by virtue of their inductive coupling provide a regenerative feedback to the base of transistor VT4, thereby to ensure that relay DS becomes properly operated if the operating signal applied from counter SC is of short duration, for example if it is constituted by an output pulse from a ferrite core element. Relay DS, which at its contact *ds2* establishes a holding circuit for itself via contact *ca2* of relay CA, contact *p5* of relay P, resistor R2 and contact *ba2* of relay BA, releases the held auxiliary relay STA and the impulse initiating relay PS at contact *ds1*, and operates the sending distributor control relay CA at contact *ds3* via back contact *aa3* of relay AA. Relay CA, which holds itself operated via contacts *ca3* and *p3* dependent on the impulse control relay P remaining operated, and also holds the impulse initiating relay PS released at contact *ca1*, inhibits further operation of the impulsing circuit PC via contact *ca4*, releases the impulse stopping relay DS at contact *ca2* and breaks the original operating circuit for relay P at contact *ca5*. It also interrupts, at contact *ca3*, the previously established energizing circuit for the sending distributor SD, which is therefore stepped to its second position. In addition it initiates at contact *ca6* the timing of an inter-train pause produced by a timed release of relay P, presently held over its contact *p2*.

With the sending distributor SD now off-normal an alternative energizing circuit is established for the request relay TB over a contact arc SD1 of the sending distributor SD and a break contact *et2* of relay ET. The request relay TB is therefore re-operated and causes a marking to be applied to the "request" signal lead R as before. When, as a result of this marking, the translator is again allocated to serve the register, the consequent operation of the code transferring relay ST again passes the code to the translator together with a digit selection marking which indicates, as determined by the sending distributor arc SD2, that the second translation digit is required. The translator thereupon marks the translation leads T according to the value of the second translation digit and the storage elements of counter SC are again set in accordance with this value. The auxiliary relay STA also operates and brings about the release of the code transferring relay ST as before, thereby freeing the translator. Relay STA holds over resistance R, but the impulse initiating relay PS remains unoperated until the operated sending distributor control relay CA is later released to close its contact *ca1*.

It may be explained here that if coded call indicator facilities (CCI) are required, the relay CA may be provided, as shown, with a second winding which can be energized by reversed polarity energization of the + and − wires J thereby to hold relay CA operated until the CCI relay set (not shown) is ready. (See Atkinson's "Telephony" p. 541 ff.)

For timing the inter-train pause, the release time of relay P may be determined by the discharging time of a capacitor in any suitable manner. By way of example, and as illustrated in FIG. 1, when the impulse controlling relay P operates it establishes at its contact *p2*, in addition to its own holding circuit, a charging circuit for a timing capacitor CP. This charging circuit can be traced via contact *b4* of relay B, contact *p2*, contact *ca6* and resistors R4, R5, R6, R7, R8. When the sending distributor control relay CA operates at the end of the sending of an impulse train, its contact *ca6* changes the connection of the capacitor CP so that the capacitor begins to discharge through a large resistance R9 via contacts *b4*, *p2*, *ca6* and resistor R4, while in the meantime applying a backing-off potential to a rectifier R*f1* which as thus backed off prevents the base of a transistor VT5 from assuming a potential (negative in the case of a p-n-p transistor) such as would permit this transistor to conduct. The capacitor CP slowly discharges until it no longer backs off rectifier R*f1* so that the base potential is permitted to assume a value such that the transistor VT5 conducts. This brings a further transistor VT6 into conduction to energize a second winding of the impulse controlling relay P. This second winding acts in opposition to the winding by which this relay is being held operated via contact *p2* and the relay P is therefore released. The consequent release of the sending distributor control relay CA at contact *p3* terminates the inter-train pause by removing the inhibition applied to the impulsing circuit PC by contact *ca4* and by permitting the impulse initiating relay PS to operate via contact *ca1*. The impulse controlling relay P then re-operates via contacts *ca5* and *ps1* and the impulsing circuit PC is again set into operation.

A train of impulses corresponding to the second translation digit is then set out over the outgoing wires J in the same manner as for the first digit and the whole process is repeated for the third and all subsequent translation digits.

Assuming that the complete translation for a particular code consists of the maximum number of digits (namely eight in the example assumed), the action after the final translation digit has been received and sent out as an impulse train over the outgoing line J is as follows. The sending distributor control relay CA, operating at the end of the impulse train for the last translation digit, initiates an inter-train pause which is timed as before. By de-energizing the sending distributor magnet SDM at contact *ca3*, it also steps the sending distributor SD to its next position, being its eighth position from normal if there were eight translation digits. In this position the sending distributor SD establishes over its contact arc SD1 and over a contact arc HD1 of the hundreds digit switch HD when the latter is off-normal, an energizing circuit for a setting relay TA. With the hundreds digit switch HD off-normal, indicating that the thousands digit has already been received and stored, the setting relay TA operates and at its contact *ta1* extends a marking over contact arc SD2 of the sending distributor SD to a contact arc THD1 of the thousands digit switch THD and thence to a second set of setting input leads N for the counter SC. Dependent upon the position of the thousands digit switch, the same or other storage elements of counter SC become set by this extended marking in accordance with the value of the thousands digit. The contact arc SD2 can be used here because the translation has been completed and the digit selection markings which it earlier determined are therefore no longer required. The operated setting relay TA also establishes, at its contact *ta2* in parallel with contact *sta1* of relay STA, an alternative operating circuit for the impulse initiating relay PS, which thereupon operates and at its contact *ps1* brings about re-operation of the impulse controlling relay P after its release at the end of the inter-train pause as before. A train of impulses representing the thousands digit is then sent out under control of the counter SC in the same manner as for the translation digits, the sending distributor control relay CA being operated at the end of the train to initiate a further inter-train pause and to step the sending distributor SD to its next position. In this next position of the sending distributor SD the counter setting relay TA is operated over its arc SD1 and arc TD of the tens digit switch TD provided that this latter switch is off-normal to indicate that the hundreds digit has been received and stored. The marking extended by contact *ta1* of the operated setting relay TA to the sending distributor arc SD2 is this time extended over this arc to a contact arc HD2 of the hundreds digit switch HD and thence to the setting input leads N of the counter SC, which is thereby set in accordance with the hundreds digit. The hundreds digit is then impulsed out in the same manner as for the thousands digit and the process is thereafter repeated for the tens and units digits using arcs TD2 and UD2 for determining the setting of the counter SC; for the tens digits the operation of the setting relay TA is effected over arc UD1 of the units digit switch UD dependent on this switch being off-normal, and for the units digit the operation of relay TA is effected over contact *cd3* of the receiving distributor control relay CD dependent upon this relay having been released after the end of the incoming impulse train representing the units digit of the code.

The sending distributor SD has a total number of steps equal to the maximum number of translation digits (eight) plus the number of numerical digits (four). Consequently after the last (units) numerical digit has been sent, the stepping of the sending distributor SD by the sending distributor control relay CA brings it back to its normal position. With the sending distributor SD now returned to normal, contact *p1* of the impulse control relay P (held operated) prevents re-energization of the request relay TB but brings about operation of a clear-down relay CO over contact *dc2* of relay DC (unoperated), contact *tb3*, contact *p1*, contact *cd2* of relay CD (unoperated), sending distributor arc SD1 in home position, contact *ba1* and contacts SD*dm*. The operated clear-down relay CO, which establishes a holding circuit for itself at contact *co1*, removes a backward hold condition from wire P at contact *co2* and brings about in known manner the release of relay A over wire PU. This effectively releases the register. Release of the impulse receiving relay A also causes release of the holding relay B by short circuit at contact *a1*, and consequently release of relay BA at contact *b1*. Release of relay BA establishes at contact *ba2* a self-drive homing circuit by which the receiving distributor RD is returned under control of its contact arc RD2 and interrupting contacts RD*dm* to its normal position, in which the homing action is interrupted at arc RD2 and a homing circuit is established for digit switch UD over contact *ba2*, arc RD2 (normal), arc UD3 (off-normal) and interrupting contact UD*dm*. Digit switch UD, on reaching its normal position, likewise establishes a homing circuit by which the digit switch TD is restored to normal, and so on until all of the digit switches UD, TD, HD, THD, CR, BR, AR have been thus restored in that order. It will be observed that the homing of each digit switch is effected under control of its arc UD3, TD3, HD3, THD3, CR3, BR3 or AR3 as the case may be, dependent upon the corresponding arc of the previous switch being in its homed condition. With switch RD and all of the digit switches now homed, an earth connection established over contact *ba2* and arcs RD3 . . . AR3 in cascade is extended to the holding winding of the clear-down relay CO via its early break contact *co3* and by thereby effectively short circuiting this holding winding to the earth applied by holding contact *co1*, brings about the release of relay CO. The register is now again ready for use.

Should the impulse receiving relay A be for any reason released at any time after the sending distributor SD has been stepped off-normal but prior to normal release of the register on completion of a normal operation, the consequent release of the relays B and BA at contacts *a1* and *b1* respectively will establish over contact *ba1* and arc SD3 a homing circuit for the sending distributor SD, which is therefore restored to normal and initiates a clear-down action as before finishing with release of relay CO.

In the foregoing the actions that have been described are those that take place after all of some maximum number of translation digits, for example eight, have been sent out by the register. In some circumstances however this maximum number of digits will not be required, some lesser number being sufficient: for example a call to a parent exchange may require only a single translation digit to route the call to that exchange. In other cases only the translation digits will be required, that is, the translation digits as sent out by the register will not need to be followed by numerical digits. To cater for these possibilities the register includes two further relays, namely the end-of-translation relay ET already mentioned and a "translation only" relay DC, each of these being operated over lead E or O as the case may be, by a marking provided by the translator in the appropriate circumstances.

For instance, if code 743 has a seven-digit translation which has to be sent out by the register without being followed by numerical digits, then the code point gate CP743 for this code (FIG. 2) would have seven output connections going to translation terminals TT and an eighth output connection (shown as including gate GX in FIG. 2) which is connected to lead O and over which the code point marking is extended to operate relay DC when the register marks digit selection lead D8 as if for an eighth translation digit. If, on the other hand, the translation for code 743 had some lesser number of digits than maximum and these digits had to be followed by the numerical digits, then gate CP743 would have a corresponding number of output connections going to the translation terminals TT and a further output connection (assumed to be that shown dotted and including gate GX') connected to lead E: the code point marking would therefore be extended to this lead E to operate relay ET when the register marks the next digit selection after the last translation digit has been sent. The operation of the end-of-translation relay ET will take place at a stage in the overall action at which the sending distributor SD is off-normal but has not reached its position for the first (thousands) numerical digit. On operating, relay ET establishes a holding circuit for itself at contact *et*1 (this holding circuit being broken to release relay ET when relays TA and DS subsequently operate) and establishes for the sending distributor SD at contact *et*2 a self-drive circuit via arc SD1 which brings the sending distributor SD to its position for the thousands digit. The register then proceeds to send out the numerical digits in the manner already described. Operation of the translation-only relay DC estabilshes at its contact *dc*2, via contact *p*6 an alternative energizing circuit by which the clear-down relay CO is operated provided that relay P is not operated. Operation of the clear-down relay CO releases the register and restores it to normal as before.

The register may be arranged as follows so as to be forcibly released if held for an abnormally long time period. At terminals "S" and "Z" there are applied so-called S- and Z-pulses which are timing pulses of which the S-pulses recur at fixed time intervals of, say, 30 seconds and the Z-pulses occur shortly before the S-pulses, giving a period somewhat shorter than 30 seconds between each S-pulse and the next Z-pulse. Following operation of the relay BA on seizure of the register, the next S-pulse to appear at terminal "S" is applied over a make contact *ba*3 of relay BA to operate an S-pulse relay TP which thereupon locks over its own contact *tp*1, contact *m*1 of a forced release relay M, and contact *b*1 of relay B. Operation of the S-pulse relay TP also establishes at contact *tp*2 a circuit over which the forced release relay M can be operated by the next Z-pulse. If the register is released, as it should be, prior to the arrival of this Z-pulse, the holding circuit for the S-pulse relay TP is broken at contact *b*1 by the release of the holding relay B and the operating circuit for the forced release relay M is therefore interrupted at contact *tp*2 before this relay has been operated by a Z-pulse. If, however, the register remains seized for an abnormally long time such that a Z-pulse arrives while the S-pulse relay is still operated, this Z-pulse operates the forced release relay M which locks over contact *m*2 via contact *b*1 until relay B is subsequently released, releases the S-pulse relay at contact *m*1, and brings about forced release of the register by extending back to the apparatus which originally seized the register, a releasing earth applied to lead FR over contact *m*3. This last-mentioned apparatus may correspond for instance to the "1st Code Selector Circuit" of the Director system described in Atkinson's "Telephony" at p. 386 ff. of vol. 2, the leads P, PU, +, —, and FR having been labelled accordingly.

Should the register seize the translator but fail for any reason to receive a translation within a reasonable time, the register may be further arranged as follows so as to be then forcibly released to free the translator for use by other registers. The receipt of a "proceed" marking on lead G, indicating that the translator has been allocated to deal with the register, initiates a timing action at the end of which, if not interrupted by reason of the register having received a translation, an alternative energizing circuit for the forced release relay M is rendered effective, thus operating this relay and releasing the register as before. This latter timing action depends on the discharge time of a capacitor CT which becomes charged, following the operation of the holding relay B, over a circuit traced from the junction of resistors R10, R11 over rectifier R*f*2, capacitor CT, and resistors R12, R13. Emitter-collector current flow in a transistor VT7 is normally prevented by reason of its emitter connection to the junction of resistors R12, R13. A marking signal received over the "proceed" signal lead G from the translator brings a further transistor VT8 into conduction and the resultant current flow through resistor R13 brings the emitter of transistor VT7 to a value appropriate to conduction of the latter. However, the voltage across capacitor CT, by backing-off a rectifier R*f*3, prevents the base of transistor VT7 from drawing current, and therefore prevents this transistor from conducting, until such time as the capacitor has discharged through transistor VT8 and resistor R14 to an extent such that it no longer backs-off the rectifier R*f*3. Conduction of the transistor VT7 then takes place (provided that transistor VT8 remains conductive until this time) and brings about operation of the forced release relay M by reason of one of its windings being connected in the collector circuit of transistor VT7. If a translation is properly received the timing action is interrupted, before operation of the forced release relay M can take place, by reason of transistor VT8 again becoming non-conductive on the removal of the "proceed" marking from lead G in consequence of the release of the translator following release of the code transferring relay ST as previously explained. To guard against failure of this timing circuit to produce forced release of the translator because of an open-circuit fault condition in the connection between the "proceed" marking lead G and the transistor VT8, a connection *c* taken from the request lead marking circuit to the timing circuit just described may continue the timing action to bring about operation of the forced release relay M if this open-circuit condition is present.

The scanning circuit already referred to as being associated with the translator for the purpose of scanning the registers which the translator serves and stopping the scanning action at a register which requires the services of the translator, may for example take the form illustrated in FIG. 3. This particular form of scanning circuit employs two multi-cathode cold-cathode tubes D1, D2 of the dekatron kind each having a number of cathodes dependant upon the number of registers to be scanned. For instance for a hundred registers, the dekatrons D1 and D2 may suitably have twelve and ten cathodes respectively and this has been assumed for FIG. 3. The dekatrons D1 and D2 have individual driving circuits DD1 and DD2 each of which, in response to a received pulse, applies suitably phased driving pulses to its dekatron so as in known manner to transfer a glow discharge therein from one cathode to the next. To this end, each driving circuit includes a four-winding transformer TR1 or TR2 of which one winding *w*1 is connected to receive an input pulse by way of transistor VT9 or VT10. The input pulse is applied to the guide electrodes *g* of the dekatron by virtue of the inductive coupling between windings *w*1 and *w*2, and is also applied by way of windings *w*1 and *w*3 as an initiating pulse to a blocking oscillator constituted by transistor VT11 or VT12 having feedback afforded by the inductive coupling between windings *w*3 and *w*4. A resulting pulse induced into winding *w*2 from winding *w*4, is applied to the dekatron guide electrodes *g* appearing a short time after the application of the original pulse thereto as is required. The driving circuit DD1 of the twelve-cathode dekatron D1 receives its pulses from a transistor pair VT13, VT14 cross-connected in known manner to form a free-running multivibrator. The driving circuit DD2 for the ten-cathode dekatron receives a pulse from one of the cathodes of the dekatron D1 each time that the glow discharge is transferred to that particular cathode, this pulse being conveyed over lead *a*. Consequently dekatron D2 has its glow discharged transferred from one cathode to the next once per cycle of operation of the dekatron D1. Certain of the remaining cathodes of the dekatron D1 are paired with cathodes of the dekatron D2 to form a number of individual pairs each relating to a particular register. One such pair only has been taken for the purposes of illustration in FIG. 3. The cathodes included in this pair, like those of each other pair, are connected through individual transistor amplifiers such as A1, A2 to two input leads *i*1, *i*2 of a triple coincidence, resistance-rectifier, gate GT a third input lead *i*3 of which is connected to the "request" lead R from the relevant register. On its output side the gate GT is connected over output lead *o* to the base of a transistor VT15. Each of the gate input leads *i*1, *i*2, *i*3 normally has a (negative) potential which while present acts through the gate to bias the transistor VT15 into conduction. This biasing potential on input lead *i*3 is removed by the action of the register in marking its "request" lead R to indicate that the services of the translator are required. On each of the other two input leads *i*1 and *i*2 the biasing potential is removed when the particular dekatron cathode with which it is associated receives the glow discharge of its dekatron. Consequently as the glow discharges circulate in the dekatrons D1 and D2, the first under control of the multivibrator VT13, VT14 and the second under control of the first, each gate such as GT is primed in its turn by the coincident removal of the biasing potential from its input leads *i*1 and *i*2, and if at the time that this occurs the third input lead has also had its potential removed by a "request" marking on lead R from the relevant register, then since all the potentials biasing the transistor VT15 into conduction have now been removed this transistor becomes cut-off. The resulting (negative) potential appearing at the collector of the cut-off transistor VT15 is applied as a marking condition to the "proceed" marking lead G extending back to the register concerned. This potential is also fed to a further transistor VT16 which now comes into conduction and effectively removes the collector potential of the multivibrator transistor VT14 by reason of the voltage drop then produced across a common resistor R15 in the collector circuits of transistors VT14 and VT16. This stops further operation of the multivibrator and thereby stops the scanning action produced by the circulation of the dekatron glow discharges. When the register has received the translation digit it asked for and subsequently removes (by the release of relay ST in FIG. 1B) the marking from its request lead T and thus from the input lead *i*3 of its gate such as GT in the scanning circuit, the normal potential of this input lead *i*3 is restored and the transistor VT15 is brought into conduction again, thereby permitting the scanning action to be recommended.

Considering now the form of the counter SC in the register of FIG. 1, this may be constituted as already mentioned, by a circuit as illustrated in FIG. 4 or FIG. 5.

In FIG. 4, the counter comprises a chain of ferrite core storage elements 0′, 0, 1′, 1 . . . 9′, 9, of the kind already referred to, each of these elements having a core *c*, an input winding *wi*, except for element 0′, a setting winding *ws*, a resetting winding *wr*, and an output winding *wo*. The core *c* can be "set" to one state of magnetic saturation by a pulse of appropriate polarity applied either to the input winding *wi* or the setting winding *ws* and can be "reset" to the opposite state of saturation by a pulse of appropriate polarity applied to the resetting winding *wr*, the change of magnetic state resulting in either case in the production in the output winding of a pulse of polarity dependent on the sense of the change. The output winding *wo* of each element except the last element 9 is connected to the input winding of the next element in the chain in such sense that the output pulse produced by the resetting of an element will constitute a setting pulse for the next element. Unidirectionally conductive devices *ud* are included in the connections between the output and input windings in order to prevent such next element from being affected by a pulse of opposite polarity resulting from setting of the preceding element, and also to prevent feedback of a pulse produced in the input winding *wi* of this next element when the latter is itself reset. Consequently if an element has been set by a pulse received either on its input winding *wi* or on its setting winding *ws*, the application of a resetting pulse to the resetting winding *wr* of this element will reset it and result in its previous set state being transferred to the next element, unless the latter is already in that state in which case its state will not change. Considering the several elements of the counter as constituting a number of stages each of which consists of a pair of adjacent elements such as 0′–0, 1′–1 . . . 9′–9, the resetting winding *wr* of the first elements 0, 1 . . . 9 in the several stages are connected in series in a first energizing circuit which includes the contact *aa*2 (FIG. 1B) of the impulse generating relay AA as a make contact, and the resetting windings *wr* of the remaining elements 0′, 1′ . . . 9′ of the stages are connected in a second energizing circuit which includes contact *aa*2 of the impulse generating relay AA as a break contact. This latter energizing circuit includes also a make contact *ps*2 of the impulse initiating relay PS (the function of this contact being explained later) and a break contact *ds*4 of the impulse stopping relay DS. As a result of these connections, the alternate operation and release of the impulse generating relay AA when the register is sending out impulses, at which time relay PS is operated and relay DS unoperated as previously explained, results in adjacent elements in the counter chain receiving resetting pulses over contact *aa*2 alternately, so that an initial set state of any element is thereby transferred along the chain towards the last element (9) in it. Once this last element in the chain has become set the next pulse applied to its resetting winding *wr* will reset it and a pulse will be obtained from its output winding *wo*. This pulse is applied via rectifier R*f*4 and capacitor C1 to the base of transistor VT4 (FIG. 1) and is of such polarity as to render this transistor conductive, thereby to operate the impulse stopping relay DS.

Since a single impulse sent out by the register involves operation of the impulse generating relay AA followed by its release, each such impulse is accompanied by a double transfer of the set state of an element in the counter, namely from one element in one stage to the corresponding element in the next stage by way of the intermediate element. For instance, if element 0 is in its set state the transmission of a single impulse will be accompanied by the transfer of this set state first to element 1′ and then to element 1. Consequently since the total number of stages must be at least equal to the total number of impulses that may have to be sent in a single impulse train, the total number of elements must be at least double the number of possible values of a digit, being at least twenty in the case of decimal digits.

Still considering FIG. 4, each of the translation leads T which enter the register from the translator is connected to the setting winding *ws* of a particular one of the elements 0, 1 . . . 9 of the several counter stages, the connections being such that this particular element will be set in response to the marking of the translation lead concerned. Moreover the connections are such that the element which thus becomes set in response to the marking of any particular translation lead belongs to that stage of the counter which corresponds to the complement of the digit value represented by that marking, namely the stage which, counting backwards from and including the last stage, has a number corresponding to the digit value. Thus for a translation digit of value 1, the element 9 of the last stage 9′–9 would be set by a marking on the appropriate translation lead and the resetting impulse applied to this element on the first operation of contact *aa*2 of the impulse generating relay AA would reset this element and cause its output winding *wr* to produce an impulse which brings about operation of the impulse stopping relay DS as explained, thereby stopping the impulsing after a single impulse as is required. For a digit of some other value, say 3, the element (7) of the third last stage would be set and alternate operation and release of contact *aa*2 of the impulse generating relay AA (contact *ps*2 being operated) would transfer the set condition first to the first element (8′) of the second last stage, then to the second element (8) of that stage, then to element 9′ of the last stage and finally to the element 9 of the last stage, from which on the next operation of the impulse generating relay AA (being its third operation) an output is obtained which brings about the operation of the impulse stopping relay DS as before. The action would be similar for translation digits of other values.

For the numerical digits the input setting leads N in the register (FIG. 1B) may be connected to respective setting windings which are associated either with the same element (0, 1 . . . 9) as are the setting windings to which the leads T are connected for the translation digits or with the other (first) elements (0′, 1′ . . . 9′) of the several stages. In this latter instance, which has been assumed for FIG. 4 and which may be preferred because the elements can then be all alike and possible difficulty is avoided in winding the requisite number of windings on to the cores of the elements (0, 1 . . . 9), provision is preferably made for effecting a preliminary action by which the set condition of a first element of a stage, resulting from the marking of the relevant one of the leads N, is transferred to the second element of that stage in order that the subsequent action under control of the impulse generating relay AA may be the same as for the translation digits. This preliminary transfer may readily be achieved, as illustrated in FIG. 4, by means of the contact *ps*2 of the impulse initiating relay PS. When this relay operates subsequently to the setting of one of the counter elements over leads T or N, contact *ps*2 applies a resetting impulse to elements 0′, 1′ . . . 9′ of the counter, contact *b*5 being operated at this time and contacts *aa*2 and *ds*4 unoperated. Since none of the elements 0′, 1′ . . . 9′ has been set in the case of a translation digit, this preliminary impulse will have no effect. In the case of a numerical digit setting, however, the set condition of one of the elements 0′, 1′ . . . 9′ will be transferred to the next element by the preliminary impulse. Provision may also be made for that on the initial seizure of the register all the elements of the counter are reset. This is the function of contact *ba*6 of relay BA, which prior to its operation provides a path by which an impulse produced by closure of contact *b*5 can be applied directly to the resetting windings of elements 0, 1 . . . 9 and via contact *ps*2 to the reseting windings of elements 0′, 1′ . . . 9′. After each counting action the counter elements are again reset by a resetting pulse applied to them over contacts *aa*2 and *ps*2 on release of relay PS before relay AA. In its operated condition, contact *ds*1 (FIG. 1B) of relay DS may also apply a condition (inhibiting earth to base of transistor VT1) which prevents the marking of the "request" lead R and thereby ensures that the counter elements have been reset before another translation digit is applied for, even although the request relay TB may already have been operated.

Each of the unidirectionally conductive devices *ud* in the counter of FIG. 4 may be conventional rectifiers, as shown for convenience, or may preferably be a further ferrite core element of the same general kind which has a first winding included in series between the relevant output and input windings of adjacent elements and a biasing winding by energization of which the element is biased to a point just beyond saturation, whereby it exhibits unidirectional properties in respect of applied pulses.

As an alternative to using magnetic elements of the kind referred to for the counter, the counter may employ active elements of other kind. For example, each stage of the counter could be constituted by a pair of transistors cross-coupled so that only one is in conduction at any time but the states of conduction can be reversed by successive pulses applied to the stage by the impulse generating relay AA.

Another form for the counter SC in FIG. 1 is illustrated in FIG. 5 and again employs ferrite core elements for storage purposes. In this instance, however, the counting of the impulses involves the use of an additional uniselector switch S similar to that used for the digit switches AR . . . UD in FIG. 1. The drive magnet of this switch S is represented at SM and interrupter contacts controlled by the magnet are represented at S*dm*. Each of the ferrite core elements 1″, 2″ . . . 0″, of which there is one for each value of a translation or numerical digit, comprises in addition to its core *c*, an output winding *wo*, first and second setting windings *ws*1, *ws*2, and a resetting winding *wr*. The setting windings *ws*1 of the several elements are respectively connected to the several translation leads T from the translator, while the other setting windings *ws*2 are respectively connected to the leads N, the connection of any particular lead T or N to a setting winding of a particular lead being this time in direct (that is, non-complementary) correspondence with the digit value which is represented when that lead is marked. The marking of one of the leads T or N will therefore result in the corresponding element becoming set. The output windings *wo* of the several elements 1″, 2″ . . . 0″ are connected in series and over a make contact *b*8 of the holding relay B (FIG. *la*) to the base of the transistor VT4 which controls the impulse stopping relay DS (FIG. 1B). The resetting windings *wr* of the several elements are connected to successive contacts, starting with the home contact, of a contact arc S1 of switch S. As the impulse generating relay AA (FIG. 1A) is alternately operated and released during the sending out of an impulse train the action in the counter is as follows. On the first operation of relay AA, its contact *aa*2 applies a resetting pulse via contact *ca*7 and the home contact of arc S1 to the resetting winding *wr* of the first ferrite core element 1″. If the digit value denoted by the marking of leads T or N was 1, this first element will have been set and will therefore be reset by this resetting pulse. An output pulse will therefore be produced in the output winding *wo* and this pulse, applied to the base of transistor VT4 via contact *b*8 (operated) will render the transistor conductive and thereby bring about operation of the impulse stopping relay DS to stop the transmission of the impulse after a single pulse, as was required. The operation of relay AA also resulted over its contact *aa*3 in the energization of magnet SM of switch S, so that on the subsequent release of this relay the switch S is stepped on to its next position, being its first off-normal position.

If the digit value was something other than 1, the first element 1″ would not have been set and the impulse applied to its resetting winding would have no effect. Relay DC would therefore remain unoperated. In this circumstance, on the next operation of relay AA its contact *aa*2 again applies a resetting pulse but this time to the resetting winding of the second element 2″ by reason of the new position of switch S. This switch is also again stepped on subsequent release of relay A. If the digit value was 2, the second element 2″ will have been set and will be reset by the resetting impulse to stop the impulsing via relay DS as before. For any higher digit value, the impulsing will not be stopped at this stage and the preceding actions will be repeated until the particular element which was set according to the digit value is reached. The resetting pulse applied by contact *aa*2 over contact arc S1 will then reset this element to stop the impulsing. After the impulsing has been stopped, at whichever element this occurs, a contact *ca*8 of relay CA (now operated) completes a self-driving homing circuit for switch S via its contact arc S2 and its interrupting contacts S*dm*. During this homing action and until relay CA is subsequently released to permit the transmission of an impulse train for the next digit, contact *ca*7 of this latter relay ensures that no resetting impulses can be applied to the storage elements 1″, 2″ . . . 9″. Should the register be released at any time when switch S is off-normal, the consequent release of relay BA (FIG. 1B) completes a homing circuit for switch S at contacts *ba*6.

The impulsing circuit PC shown in block form in FIG. 1A may, for example, be constituted by a self-interrupting circuit for relay AA with timed release, by a multivibrator circuit providing alternate energization and de-energization of relay AA. These two possibilities are illustrated in FIGS. 6 and 7 respectively.

In FIG. 6 the relay AA has two windings of which one is connected in series with contact *ca*4 of relay CA, this being a break contact in this instance, contact *p*4 of relay P, and a self-interrupting contact *aa*4. The second winding of relay AA is connected in parallel with the first and there is included in series with this second winding, capacitance of preselectable amount provided by appropriate strapping into circuit one or more capacitors from a graded series C1, C2, C3, C4. . . . On operation of the impulse controlling relay P to initiate an impulse train, its contact *p*4 brings about operation of relay AA over contact *ca*5 (unoperated). Relay AA then releases itself by opening its contact *aa*4, following which, with contact *aa*4 again closed, the relay again operates. This alternate operation and release, accompanied by the transmission of impulses, continues until contact *ca*4 is opened when relay CA operates in response to operation of the impulse stopping relay DS (FIGS. 1A and 1B). The duration of and interval between the transmitted impulses, are determined by the release and operate lags respectively of relay AA and these in turn are determined by the selected capacitance included in series with the second winding of relay AA.

The multivibrator impulsing circuit of FIG. 7 can give rather better control of the characteristics of the transmitted impulses. Referring to FIG. 7, the multivibrator is constituted by a pair of cross-coupled transistors VT17 and VT18 having respective collector resistors R16 and R17 and having resistance-capacitance coupling R18–C5, R19–C6 between a suitable point in the collector circuit of each transistor and the base of the other transistor. To bring the multivibrator into operation contact *p*4 of the impulse controlling relay P is connected either in the emitter circuit of one of the transistors VT17, VT18 or preferably, as shown, between the collector of one of the transistors, VT17, and the point (*x*) at which the coupling from its collector circuit is taken to the base of the other transistor VT18. In this way, after operation of the holding relay B or its slave relay BA has energized the multivibrator circuit, for example by closure of contact *ba*7 of relay BA, the circuit assumes a quiescent condition in which transistor VT18 is fully conductive, the capacitor C6 in the cross-coupling to the base of this transistor VT18 becomes fully charged, and transistor VT17 is held non-conductive by the open contact *p*4 of the impulse controlling relay P. The multivibrator is therefore ready for immediate change-over of the states of conduction of its transistors on closure of contact *p*4 when the impulse controlling relay P operates to initiate impulsing, there being no delay such as might otherwise be occasioned by the capacitor C5 having first to charge up. Consequently deformation of the first impulse produced by the impulse generating relay AA can be avoided without making special provision to this end. Each of the multivibrator transistors VT17 and VT18 preferably has a capacitor C7, C8 connected between its base and collector electrodes as shown, in order to reduce the frequency response of the transistors and thereby make them less sensitive to surges which might be set up by relays operating in the vicinity and might otherwise tend to result in mal-operation. The impulse generating relay AA is controlled through a further transistor VT19 from the collector of that multivibrator transistor (VT18) which is conductive in the quiescent state. Operation of relay CA following operation of the impulse stopping relay DS inhibits further operation of the multivibrator by short-circuiting at contact *ca*4 the multivibrator transistor (VT18) that was conductive in the quiescent state. In order to ensure that the multivibrator action is quickly stopped after operation of relay DS, a contact *ds*5 of this latter relay may be included as shown, having the function of applying to the connection between transistors VT18 and VT19 a potential (earth) which holds them both non-conductive and thereby inhibits operation both of the multivibrator and of the impulse generating relay AA. The inoperative condition of the multivibrator would subsequently be maintained by contact *ca*4.

What we claim is:

1. A register sender circuit for use with a common translator comprising a plurality of electromechanical storage devices for storing the values of received code and numerical digits, the storage devices each including a marking contact arc and a moving contact, a set of code marking leads connected to the marking arc for extending the stored code digit values toward the common translator, means responsive to the availability of the translator to transfer a code signal to the code marking leads from the storage devices, translation digit leads for receiving translation digits from the translator, a plurality of static storage devices connected to the translation digit leads to store the values of the translation digits, and means connected to the static storage devices for extending a freeing signal toward the translator, and to initiate the sending of pulses, the number of pulses sent being controlled by the information stored by the static storage devices.

2. A register as claimed in claim 1 wherein the electromechanical storage devices are equal in number to the number of code and numerical digits to be received, where the marking arcs of each electromechanical storage device for a code digit are connected in common to the set of code marking leads, corresponding contacts of each arc being connected to one of the marking leads, and where the code transferring means comprises switching means for selectively energizing the moving contact of one of the code digit storage devices.

3. A register circuit as claimed in claim 2, wherein said code transferring switching means is common to said arcs of the code digit switches, respective isolating devices being included between this switching means and the moving contacts of these arcs.

4. The invention of claim 3, where the code transferring switching means includes means responsive to the availability of a translator to generate a signal for holding the translator, and means connected to the translation digit leads and responsive to signals thereon to cause the removal of the translator holding signal.

5. A register circuit as claimed in claim 1, further including, means for accepting translation digits one at a time, a set of digit selection leads extending towards the translator, a sending distributor to selectively energize one of the digit selection leads to indicate the particular translation digit required at any time, and further including means to generate an impulse train, equal in number to the value of a selected transmission digit, and means for stepping said distributor after each successive pulse train has been generated.

6. A register circuit as claimed in claim 5, wherein said sending distributor is also operable, after impulse trains corresponding to all translation digits have been generated to successively initiate the generation of a further train of impulses for each electromechanical numerical digit storage device, the number of impulses in each pulse train being determined by the value of the digit stored in each of the digit storage devices.

7. A register circuit as claimed in claim 6, including means operable subsequently to the sending of the last translation digit for releasing the register without transmission of numerical digits, said means being responsive to a signal from the translator indicating that sending of numerical digits is not required.

8. A register circuit as claimed in claim 6 including for a translation having less than a certain maximum number of digits a self driving circuit for the sending distributor and means responsive to a signal indicating that the last translation digit received by the static storage devices for operating the self driving circuit to successively step the sending distributor until the sending distributor reaches the position corresponding to the electromechanical storage device for the first numerical digit.

9. The invention of claim 1 where said static storage devices are static electronic means.

10. The invention of claim 1 wherein said static storage devices are electromagnetic means.

11. A register-sender circuit intended for use in a telecommunication system in conjunction with a common translator and comprising a plurality of electromechanical digit switches for individually registering the values of received code and numerical digits, said digit switches comprising contact arcs and cooperating moving contacts, a request relay connected to the digit switch for the last code digit and operable in response to an off-normal condition, a "request" signal lead connected to the contacts of the request relay to be marked in response to operation of the request relay thereby to indicate that the register requires the services of the translator, this marking subsequently constituting a holding condition for the translator, a proceed signal lead to receive an indication that the register can proceed to use the translator, a high-speed code transferring relay which, in response to a marking received over the "proceed" signal lead operates to apply a marking to the moving contacts of respective marking contact arcs of the code digit switches, a set of code marking leads extending towards the translator from each of said marking contact arcs so as to be marked according to the setting of the relevant digit switch, translation digit leads for receiving translation digits from the translator as combinations of markings thereon, a plurality of static storage devices with high-speed response connected to register the values of translation digits as received over said translation digit leads, a high-speed auxiliary relay operable in response to markings on said translation digit leads and effective on operating to release the code transferring relay, release of this last-mentioned relay being effective to remove said holding condition and thereby free the translator, and means operable in response to operation of the auxiliary relay to initiate sending of a train of impulses determined according to a registered translation digit value.

12. A register circuit as claimed in claim 11, wherein the last-mentioned means comprises an impulse initiating relay operable in response to operation of the auxiliary relay, an impulse controlling relay operable in response to operation of the impulse initiating relay, an impulsing circuit responsive to operation of the initiating relay to control the generation of said impulses, an inpulse counting arrangement including said static storage devices connected to the impulsing circuit to count a number of pulses equal to a number stored in the static storage devices corresponding to a translation digit value, an impulse stopping relay operable from the counting arrangement in response to the impulses reaching the number corresponding to the registered translation digit value, means connecting the stopping relay to the impulsing circuit and the impulse initiating relay to stop the impulsing and to release the impulse initiating relay, and an intertrain pause timing circuit initiated into operation following operation of the impulse stopping relay to release the impulse controlling relay at the end of the interval timed thereby, said impulse controlling relay also operating to remove and prevent re-application of the marking on the request signal lead.

References Cited by the Examiner

UNITED STATES PATENTS

| | | | |
|---|---|---|---|
| 2,447,495 | 8/1948 | den Hertog et al. | 179—18 |
| 2,475,553 | 7/1949 | McCreary | 179—18 |
| 2,675,426 | 4/1954 | Vroom | 179—18 |
| 2,724,743 | 11/1955 | Benson | 179—18 |
| 2,852,613 | 9/1958 | Faulkner | 179—18 |
| 2,876,289 | 3/1959 | Faulkner | 179—18 |
| 2,882,345 | 4/1959 | Faulkner | 179—18 |

ROBERT H. ROSE, *Primary Examiner.*

WALTER L. LYNDE, L. MILLER ANDRUS, *Examiners.*